United States Patent
Pladson (10) Patent No.: US 7,971,914 B1
(45) Date of Patent: Jul. 5, 2011

(54) AUXILIARY HANDLE ATTACHMENT FOR A TOOL

(76) Inventor: James M. Pladson, Fargo, ND (US)

( * ) Notice: Subject to any disclaimer, the term of this patent is extended or adjusted under 35 U.S.C. 154(b) by 32 days.

(21) Appl. No.: 12/652,455

(22) Filed: Jan. 5, 2010

(51) Int. Cl.
*A01B 1/22* (2006.01)
*B25G 3/20* (2006.01)

(52) U.S. Cl. .......................... 294/58; 16/426

(58) Field of Classification Search .............. 294/51, 294/53.5, 54.5, 55, 55.5, 58, 59, 60; 37/285; D8/10; 16/426, 427, 429; 254/131.5
See application file for complete search history.

(56) References Cited

U.S. PATENT DOCUMENTS

| | | | | |
|---|---|---|---|---|
| 715,056 | A | * | 12/1902 | Gruner .............. 294/58 |
| 933,647 | A | * | 9/1909 | Hunt ................ 294/58 |
| 1,534,075 | A | * | 4/1925 | Washington ......... 294/58 |
| 3,155,414 | A | * | 11/1964 | Bales ............... 294/58 |
| 3,751,094 | A | * | 8/1973 | Bohler .............. 294/58 |
| 4,050,728 | A | | 9/1977 | Davidson |
| 4,537,433 | A | | 8/1985 | Yang |
| 4,615,553 | A | | 10/1986 | Hultine |
| 4,701,142 | A | * | 10/1987 | Merritt ............. 294/58 |
| 4,772,057 | A | | 9/1988 | Harvey |
| 4,794,667 | A | * | 1/1989 | Nelson et al. ....... 294/58 |
| 5,447,349 | A | | 9/1995 | Coble |
| 5,499,852 | A | | 3/1996 | Seigendall |
| 5,669,650 | A | * | 9/1997 | Rutz ................ 294/58 |
| 6,371,542 | B1 | | 4/2002 | Hasbani |
| 7,300,081 | B1 | | 11/2007 | Murray et al. |
| 2002/0109364 | A1 | | 8/2002 | Graves |
| 2004/0196156 | A1 | | 10/2004 | Wilker et al. |

OTHER PUBLICATIONS

Macen's Grip, Macen'z Creation'z, website no longer available, previously retrieved from www.macensgrip.com on Nov. 19, 2008, 2 pages.
The Backsaver Grip Ergonomic Handle Add-On, Life with Ease, retrieved from http://www.lifewithease.com/backsaver_grip.html, 3 pages.
Back-Saver Ergonomic Snow Shovel, Life with Ease, retrieved from http://www.lifewithease.com/backsaver.html, 3 pages.
The Back Buddy Handle Ergonomic Tool Accessory, Life with Ease, retrieved from http://www.lifewithease.com/backbuddy.html, 3 pages.

* cited by examiner

*Primary Examiner* — Paul T Chin
(74) *Attorney, Agent, or Firm* — Neustel Law Offices (57) ABSTRACT

An auxiliary handle attachment for efficiently decreasing or eliminating the requirement to bend over and cause strain upon ones back when using a long-handled tool, such as a shovel, broom, rake, or the like. The auxiliary handle attachment generally includes a mounting structure having a first channel member including a first channel and a second channel member including a second channel aligned with the first channel, an auxiliary shaft extending upwardly from the mounting structure, and an auxiliary handle extending from the shaft. The mounting structure is adapted to attach to the shaft or handle of the tool by collectively receiving the shaft from an upper side of the first channel opposite the first channel member and a lower side of the second channel opposite the second channel member. Various fastening members and grips may also be used to secure the shaft within the channel members of the mounting structure.

20 Claims, 13 Drawing Sheets

AUXILIARY HANDLE ATTACHMENT FOR A TOOL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a tool attachment and more specifically it relates to an auxiliary handle attachment for a tool for efficiently decreasing or eliminating the requirement to bend over and cause strain upon ones back when using a long-handled tool, such as a shovel, broom, rake, or the like.

2. Description of the Related Art

Any discussion of the related art throughout the specification should in no way be considered as an admission that such related art is widely known or forms part of common general knowledge in the field.

Long-handled tools, such as shovels, brooms, rakes, hoes, and the like are widely use for performing various tasks. Typically, when using the tools, the user must repeatedly bend over to lift, push, and/or control the tool. This can often result in forcing the individual to extend beyond a comfortable range of motion and cause strain upon one's back. Because of the inherent problems with the related art, there is a need for a new and improved auxiliary handle attachment for a tool for efficiently decreasing or eliminating the requirement to bend over and cause strain upon ones back when using a long-handled tool, such as a shovel, broom, rake, or the like.

BRIEF SUMMARY OF THE INVENTION

A system for efficiently decreasing or eliminating the requirement to bend over and cause strain upon ones back when using a long-handled tool, such as a shovel, broom, rake, or the like. The invention generally relates to a tool attachment which includes a mounting structure having a first channel member including a first channel and a second channel member including a second channel aligned with the first channel, an auxiliary shaft extending upwardly from the mounting structure, and an auxiliary handle extending from the shaft. The mounting structure is adapted to attach to the shaft or handle of the tool by collectively receiving the shaft from an upper side of the first channel opposite the first channel member and a lower side of the second channel opposite the second channel member. Various fastening members and grips may also be used to secure the shaft within the channel members of the mounting structure.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 13 illustrate an auxiliary handle attachment for a tool 10, which comprises a mounting structure 20 having a first channel member 30 including a first channel 33 and a second channel member 40 including a second channel 43 aligned with the first channel 33, an auxiliary shaft 50 extending upwardly from the mounting structure 20, and an auxiliary handle 60 extending from the shaft 13. The mounting structure 20, auxiliary shaft 50, and auxiliary handle 60 are preferably integrally formed in a one-piece structure.

The mounting structure 20 is adapted to attach to the shaft 13 or handle of the tool 12 by collectively receiving the shaft 13 from an open upper side of the first channel 33 opposite the first channel member 30 and an open lower side of the second channel 43 opposite the second channel member 40. Various fastening members 37, 47 and grips 34, 44 and 38, 48 may also be used to secure the shaft 13 collectively within the channels 33, 43 of the mounting structure 20. It is appreciated that the open side of the first channel member 30 substantially longitudinally aligns with the closed side of the second channel member 40 and the closed side of the first channel member 30 substantially longitudinally aligns with the open side of the second channel member 40.

The tool 12 generally includes an elongated shaft 13 (i.e. handle) which is also generally comprised of a uniform diameter. The tool 12 includes an implement 14 at the end of the shaft 13 which may be comprised of various types, such as a shovel, rake, broom, etc.

B. Mounting Structure

The present invention includes the mounting structure 20 for affixing to the shaft 13 or handle of the tool 12 generally at a midway point along the length of the shaft 13 of the tool 12. The mounting structure 20 is generally comprised of a rigid structure and material, such as but not limited to plastic, metal, or wood. It is appreciated that the front and rear channel members 30, 40 may also maintain a degree of flexibility to prevent breaking when heavy loads are applied to the implement 14. The mounting structure 20 is adapted to removably attach to the shaft 13 of the tool 12 without permanently altering the shaft 13 of the tool 12 in any manner. It is appreciated that the channel members 30, 40 may be alternately constructed to be flat in structure, include hooks, or be comprised of various other configurations.

The mounting structure 20 generally includes a first arm 22 extending in a forward direction and leading to a first channel member 30 and a second arm 23 extending in a rearward direction and leading to a second channel member 40. An open portion 25 is defined between the first arm 22 and the second arm 23 to separate the first channel member 30 from the second channel member 40 and allow for the shaft 13 of the tool 12 to be easily inserted within and attached to the mounting structure 20.

The channel members 30, 40 are generally comprised of similar elongated structures, yet are oriented rotationally opposite and extend in opposite directions from the center of the mounting structure 20. In the preferred embodiment, the first channel member is comprised of a right side up U-shaped cross-sectional structure having a first channel 33 formed therein for receiving the shaft 13 of the tool 12 and engaging an underside of the shaft 13 when positioned within the first channel 33. The second channel member 40 is comprised of an upside down U-shaped cross-sectional structure having a second channel 43 formed therein for receiving the shaft 13 of the tool 12 and engaging a top side of the shaft 13 when positioned within the second channel 43. The cross-sectional shape of the channel members 30, 40 may also be V-shaped rather than U-shaped to accommodate a wider width of shafts 13. Thus, the shaft 13 of the tool 12 is engaged both on an underside and on a top side to stabilize the shaft 13 about the mounting structure 20.

The channel members 30, 40 each define an upper or lower perimeter of a circular shape and the channels 33, 43 formed by the channel members 30, 40 preferably align with each other. The diameter of the formed first channel 33 and second channel 43 may be of various sizes to accommodate various sized handles. The first channel member 30 thus is lower than the second channel member 40 since the first channel member 30 wraps around the bottom of the shaft 13 of the tool 12 and the second channel member 40 wraps around the top of the shaft 13 of the tool 12. It is appreciated that the channel members 30, 40 may attach around opposing left and right sides of the shaft 13 in alternate embodiments rather than the top and bottom side of the shaft 13.

Each of the channel members 30, 40 also preferably include a tapered distal end 31, 41, generally opposite the opposing channel member 30, 40, to allow for the shaft 13 of the tool 12 to be more easily slid within a respective channel 33, 43 of the channel member 30, 40. The tapered distal end 31, 41 also allows the channel members 30, 40 to attach to various diametric shafts 13 of tools 12. In addition, each of the channel members 30, 40 include a grip material 34, 44 within a respective channel member 30, 40 for assisting in gripping the shaft 13 of the tool 12. The grip material 34, 44 may be comprised of various gripping materials, such as but not limited to rubber. The channel members 30, 40 at furthest outward ends may tilt toward centerline of the tool shaft 13 (while not in use) to aid in the grasping of shafts of differing diameters whether uniform or varying in diameter. This will either eliminate or aid in the function of the tapered ends 31, 41.

In addition, each of the channel members 30, 40 preferably includes at least one fastening member 37, 47 for laterally extending over the shaft 13 positioned within the respective channel 33, 43 and around the channel member 30, 40. The fastening members 37, 47 are generally held onto the respective channel members 30, 40 via a looped attachment 36, 46 which allows sliding of the fastening member 37, 47 at least partially therethrough. Each fastening member 37, 47 may include a stopper 38, 48 located at an end for preventing the fastening member 37, 47 from sliding completely through a respective attachment 36, 46.

The fastening members 37, 47 may be comprised of various structures all which allow for the fastening member 37, 47 to secure the shaft 13 within a respective channel 33, 43. In the preferred embodiment, the fastening members 37, 47 are comprised of a hook and loop nylon strap structure to be wound around the shaft 13 and channel member 30, 40 and secured upon itself. The fastening member 37, 47 also preferably includes a grip material 39, 49 located along an inside surface for gripping the exposed perimeter of the shaft 13 when wrapped around. The grip material 39, 49 may be comprised of various gripping materials, such as but not limited to rubber.

C. Auxiliary Shaft

An auxiliary shaft 50 extends in an upward manner from the mounting structure 20. In a preferred embodiment, the auxiliary shaft 50 extends in a slightly rearward manner, away from the first channel member 30, to allow for a more comfortable grip. The auxiliary shaft 50 may be comprised of various lengths and widths to accommodate the size of the individual using the present invention and the tool 12 being attached thereto. The shaft 13 may extend at various angles from the mounting structure 20, such as perpendicular to form a 90 degree angle, 45 degree angle, or various others.

The auxiliary shaft 50 may include a male attachment end 52 for allowing swiveling of the auxiliary handle 60 and removability of the auxiliary handle 60 therefrom. The male attachment end 52 may also include a notch 54 to allow a tab 53 on a lateral outer end to laterally retract and expand for easy insertion within a female attachment end 62 and locking therein.

D. Auxiliary Handle

The auxiliary handle 60 extends from the auxiliary shaft 50 and may be comprised of various structures. The auxiliary handle 60 may include a looped structure, various gripping materials, or may be comprised of various other structures. The handle 60 may include an opening 61 for the user to better grasp the handle 60 when lifting or pushing thereon.

The auxiliary handle 60 may includes the female attachment end 62 having a spiked projection 64 extending towards the auxiliary shaft 50. The projection 64 receives the notch 54 and works to separate the notch 54 to lock outwardly extending tabs 53 of the male attachment end 52 within the female attachment end 62 over a respective holding ledge 63 to prevent the handle 60 from being pulled loose from the auxiliary shaft 50 yet allow the auxiliary handle 60 to rotate with respect to the auxiliary shaft 50. As appreciated, the shaft 50 can be comprised of various structures or shapes.

The user may thus rotate the handle 60 to a desired position to achieve a more comfortable grasp upon the present invention when utilizing. It is appreciated that the handle 60 may rotate 360 degrees with respect to the auxiliary shaft 50.

E. Operation of Preferred Embodiment

Figure 1:
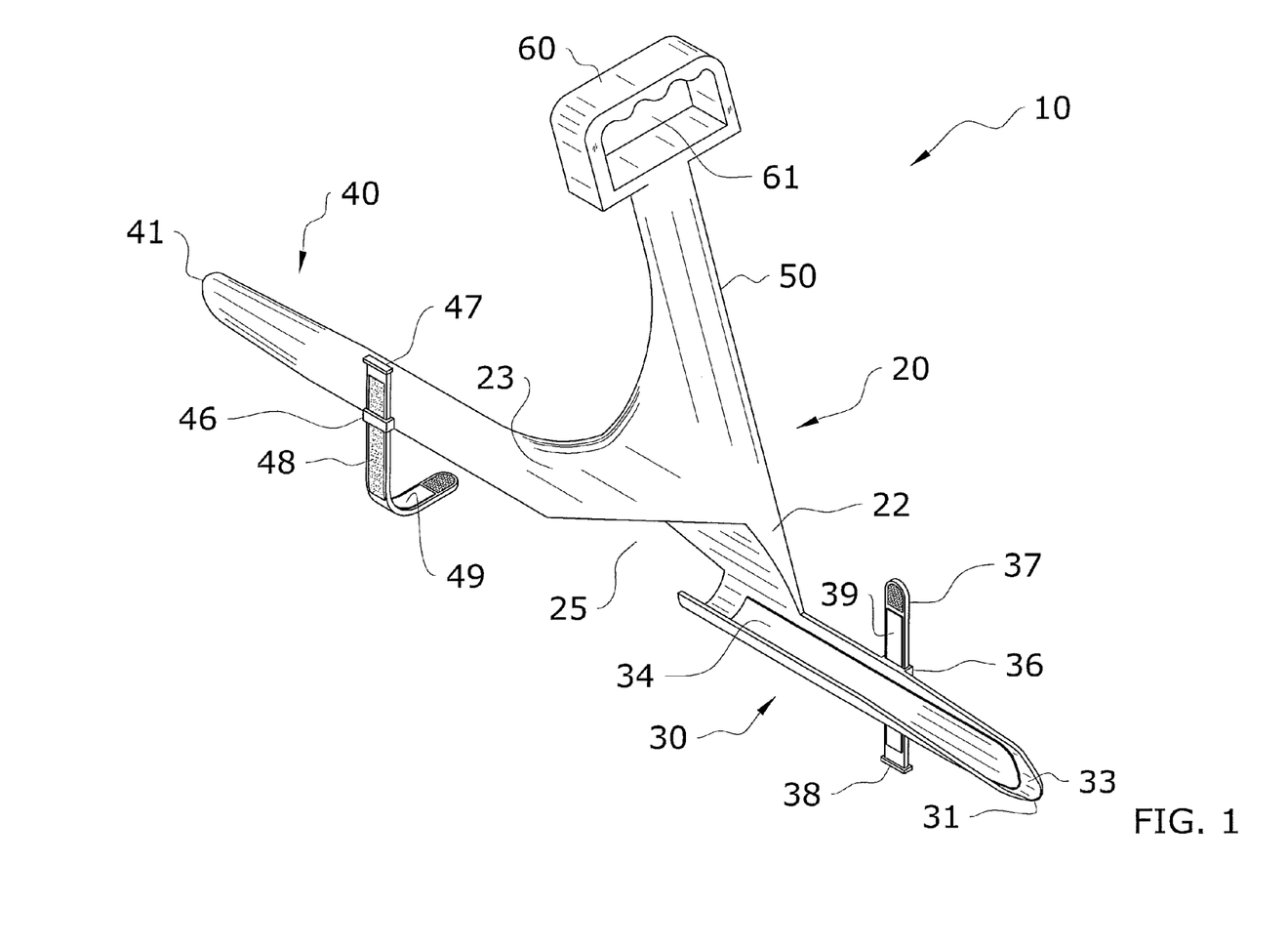
FIG. 1 is an upper perspective view of a first side of the present invention.
Figure 2:
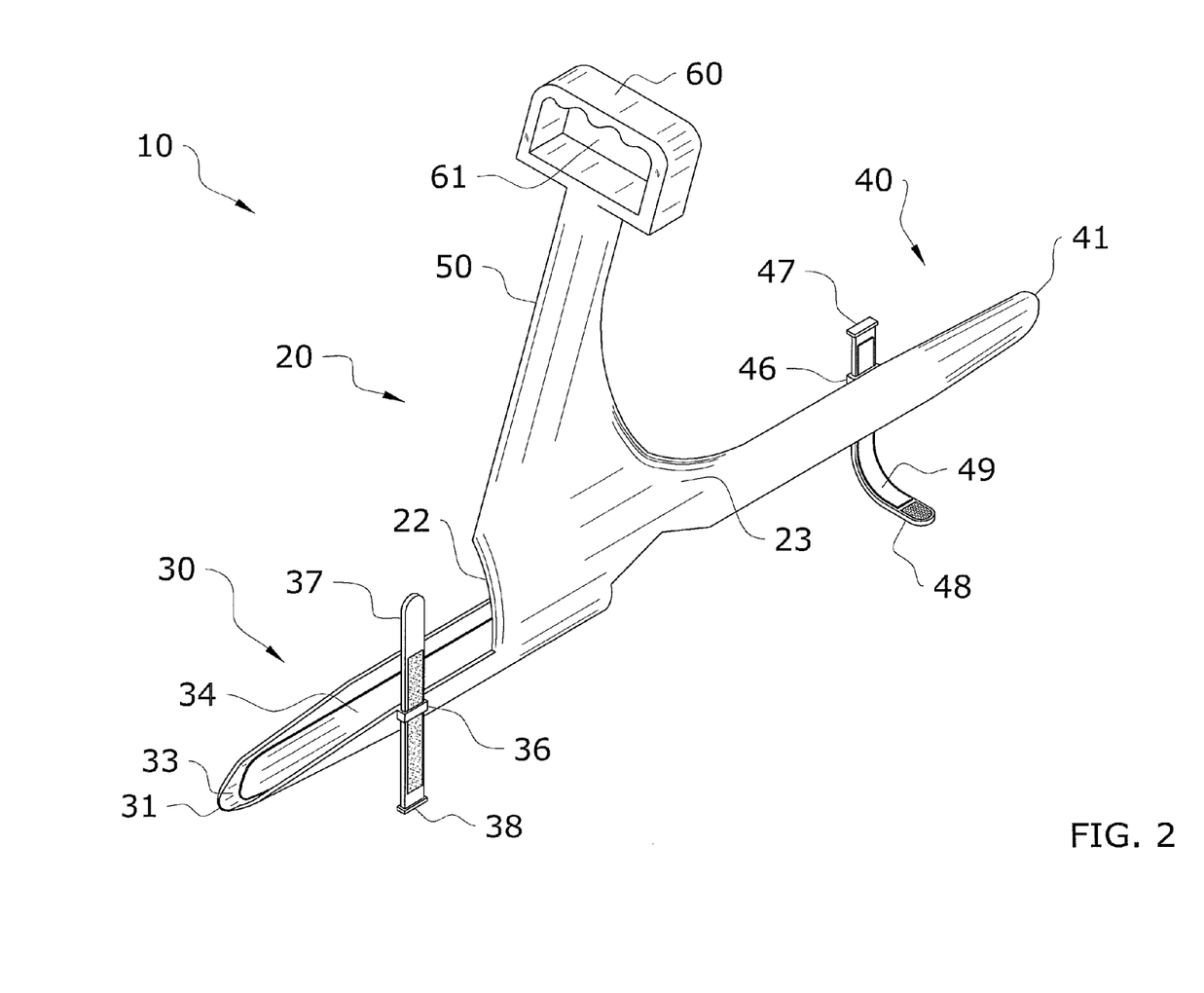
FIG. 2 is an upper perspective view of a second side of the present invention.
Figure 3:
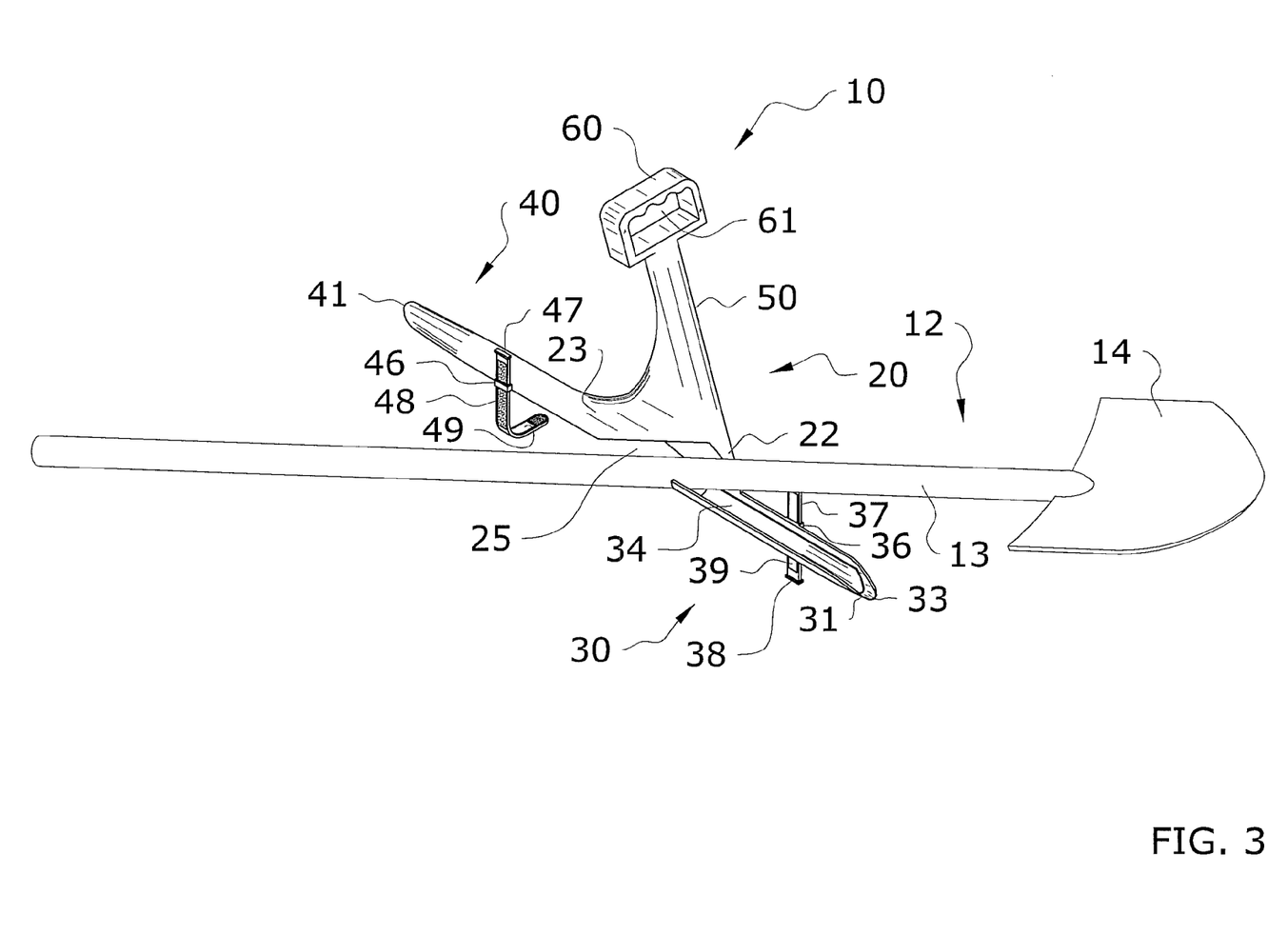
FIG. 3 is an upper perspective view of the present invention with a tool being attached to the mounting structure.
Figure 4:
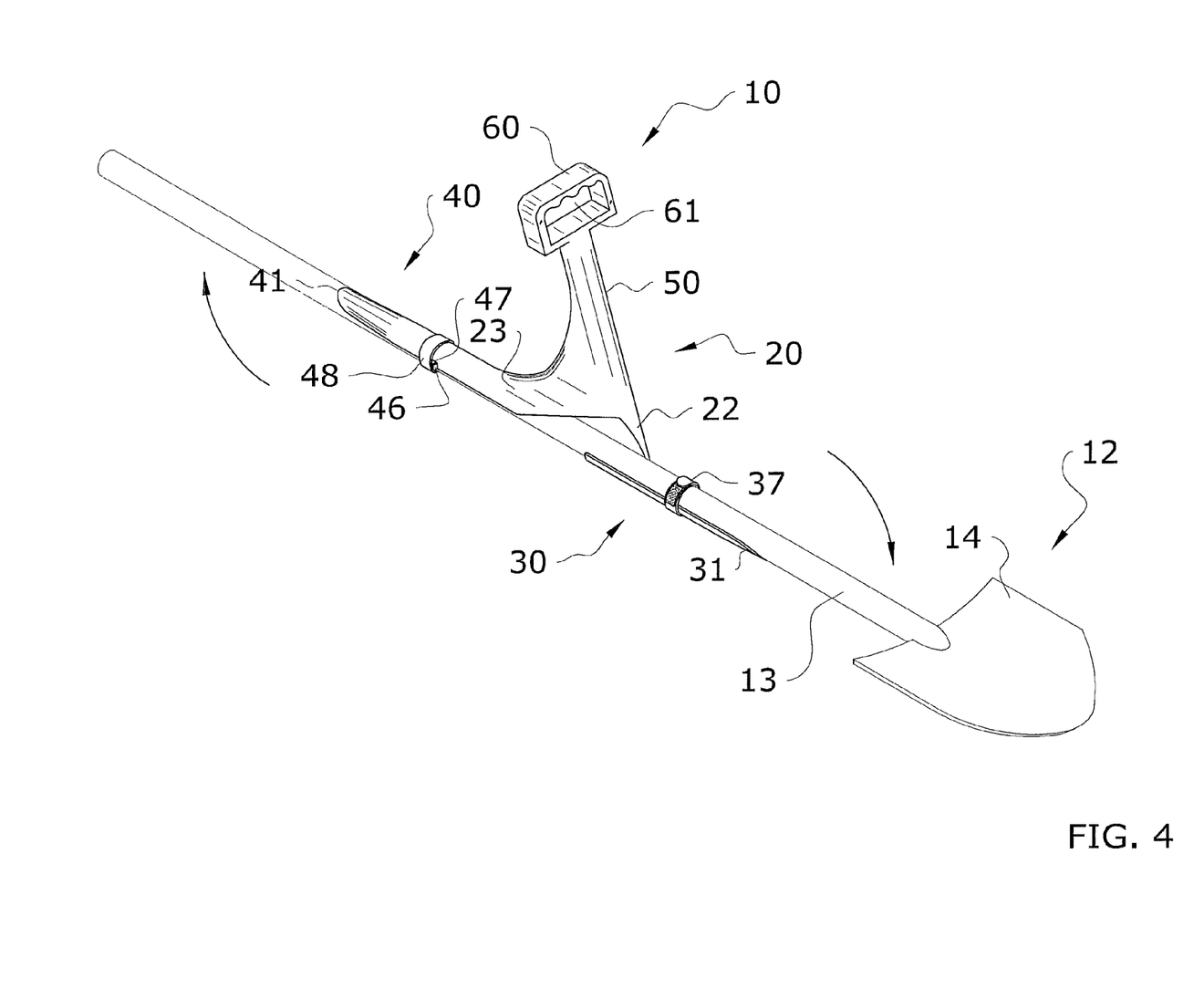
FIG. 4 is an upper perspective view of the present invention with a tool attached to the mounting structure.
Figure 5:
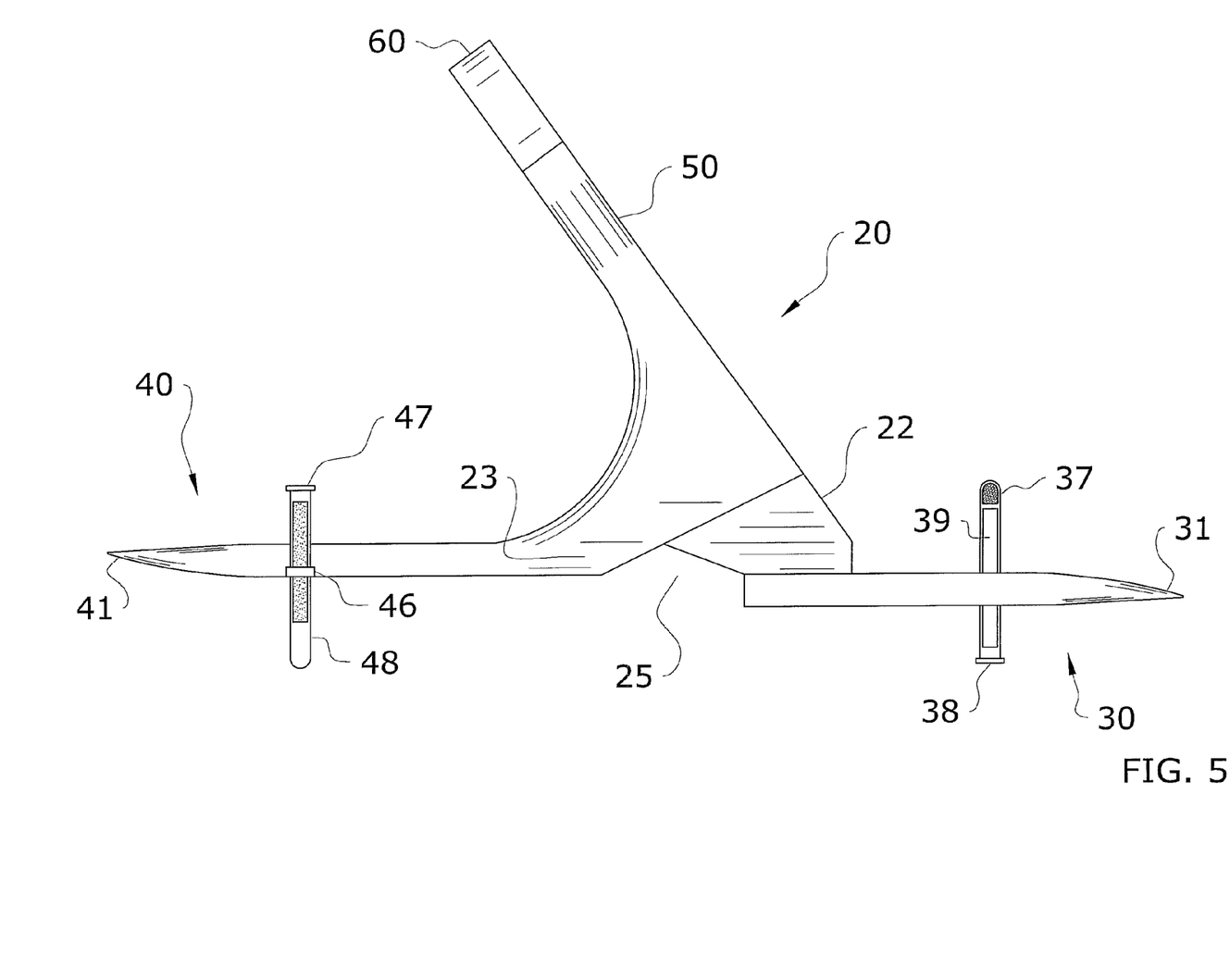
FIG. 5 is a first side view of the present invention.
Figure 6:
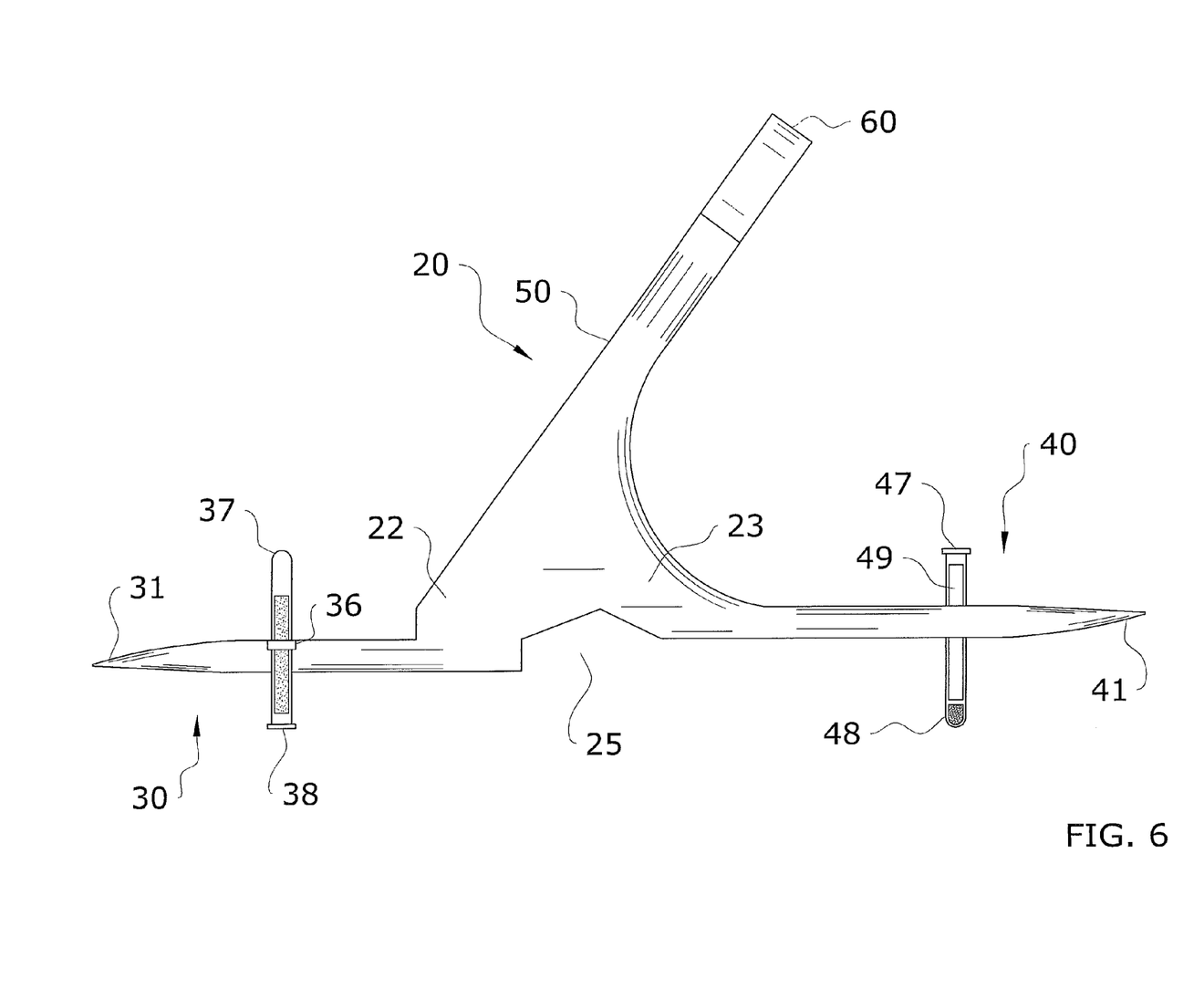
FIG. 6 is a second side view of the present invention.
Figure 7:
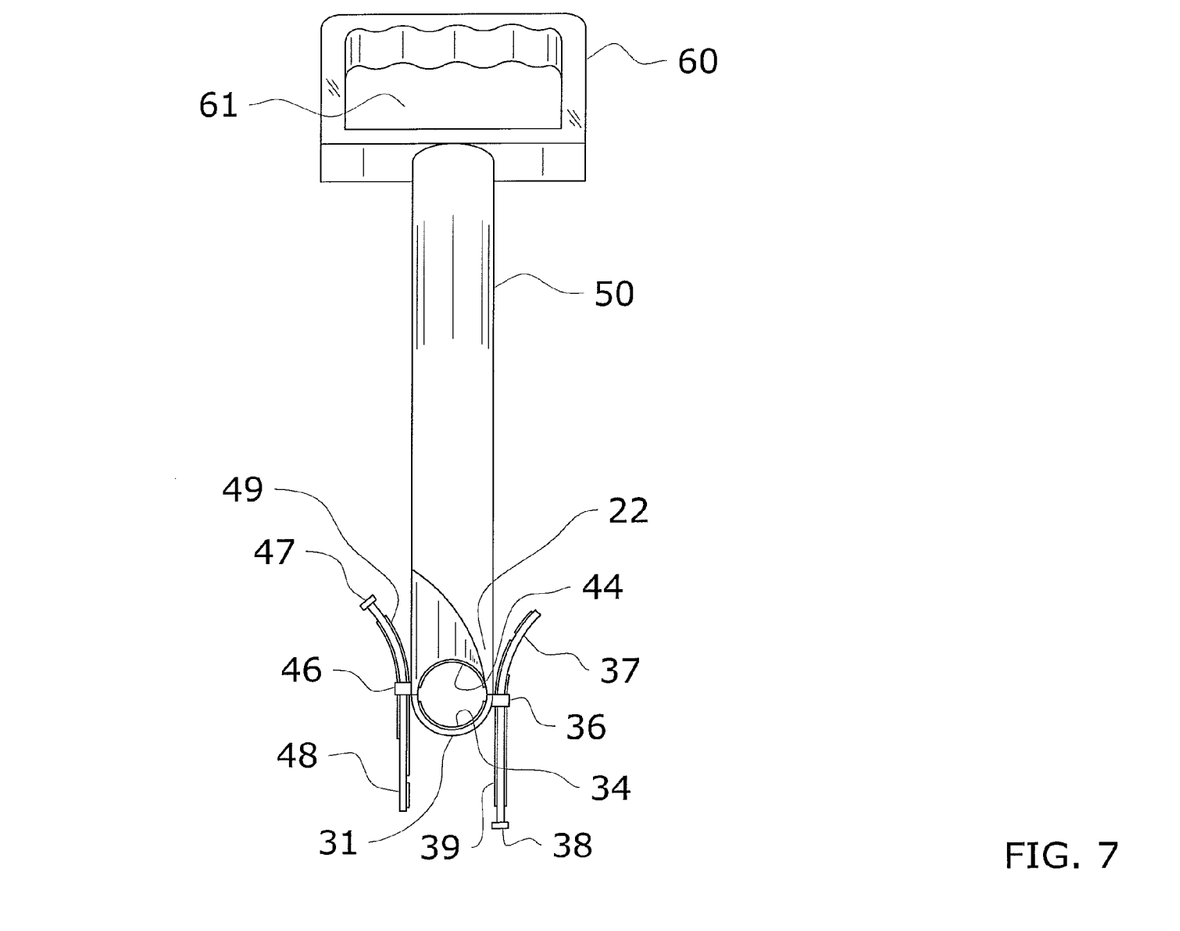
FIG. 7 is a front view of the present invention.
Figure 8:
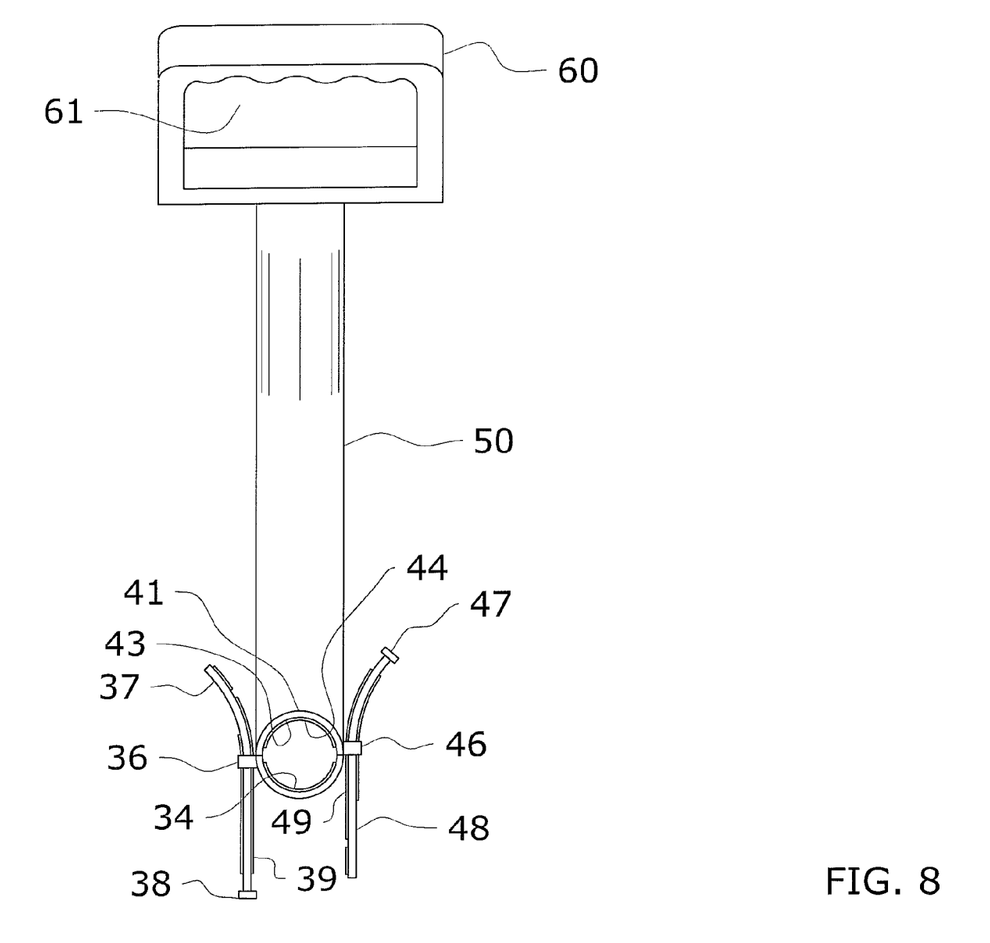
FIG. 8 is a rear view of the present invention.
Figure 9:
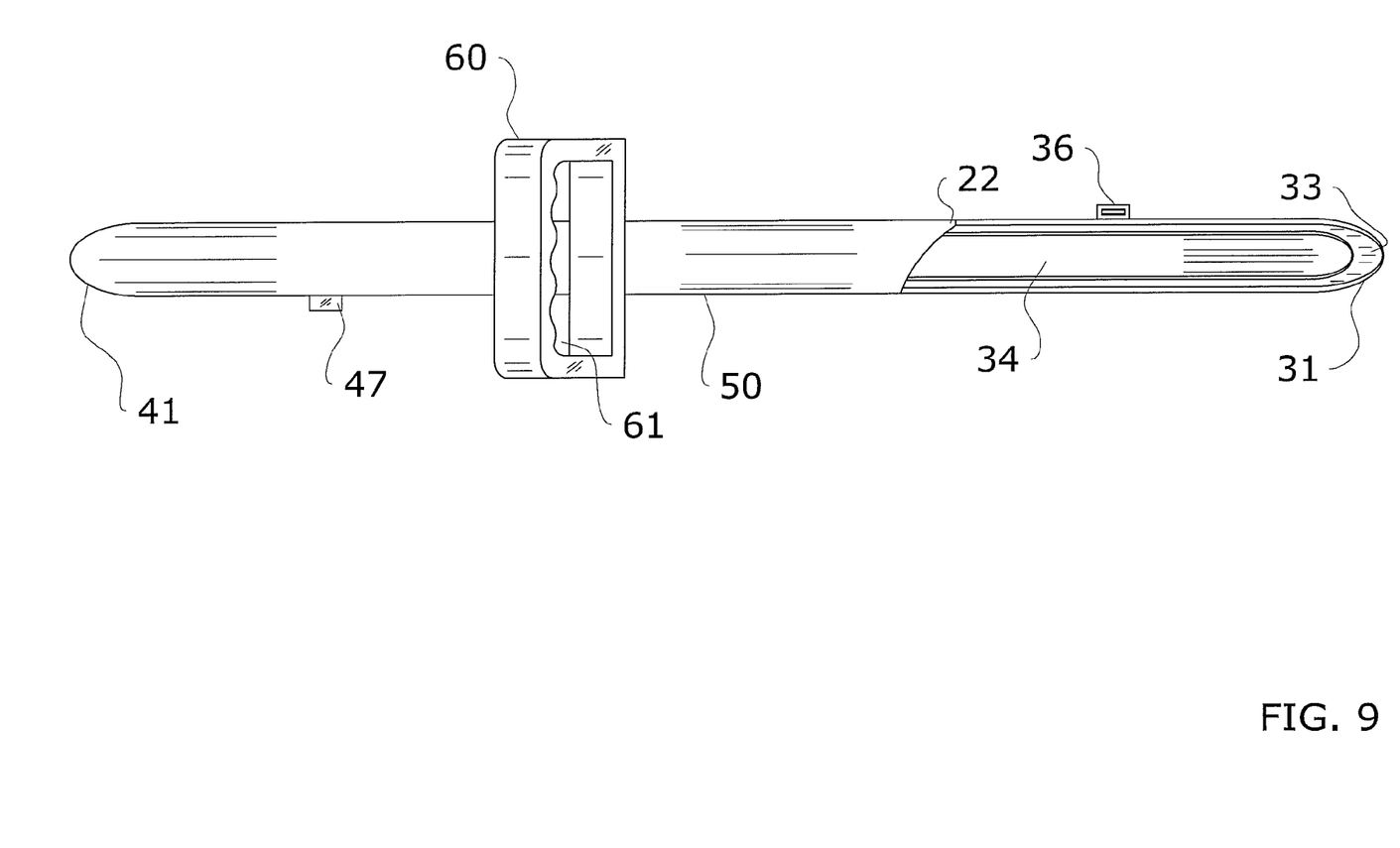
FIG. 9 is a top view of the present invention.
Figure 10:
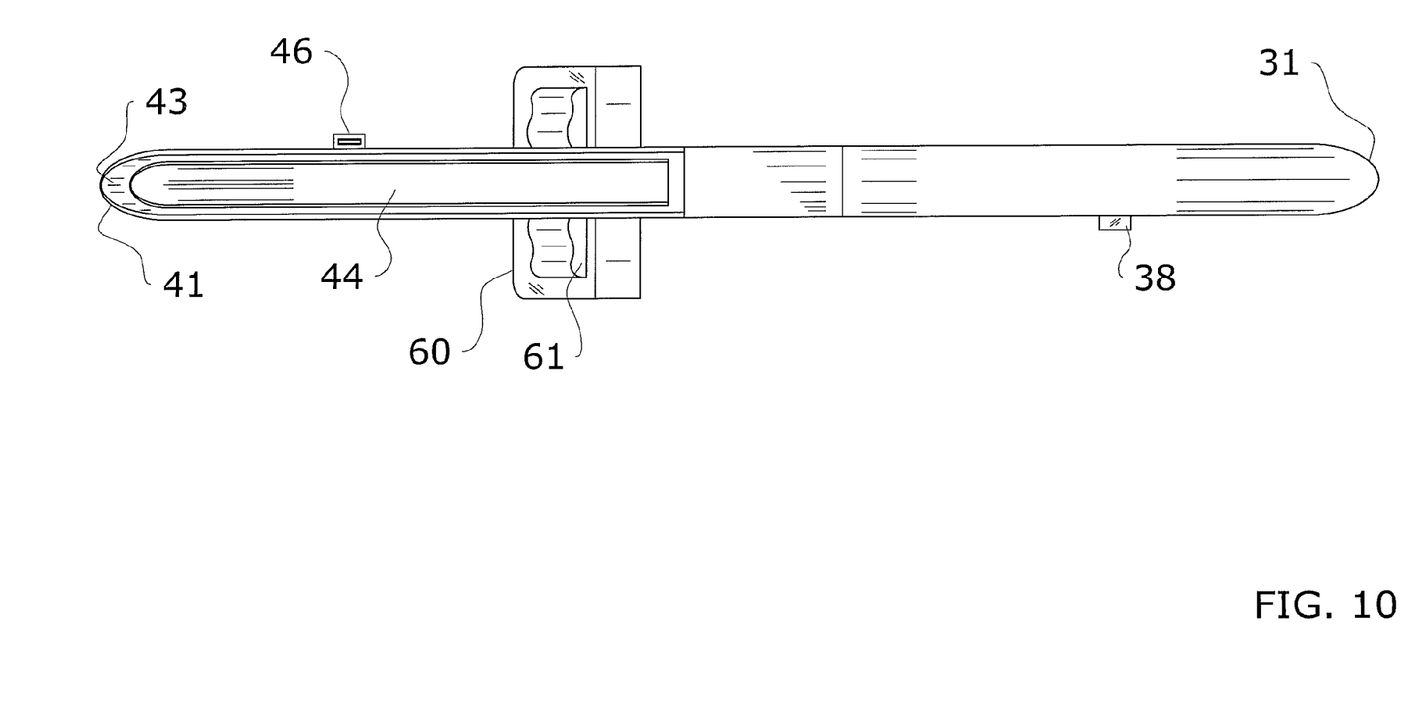
FIG. 10 is a bottom view of the present invention.
Figure 11:
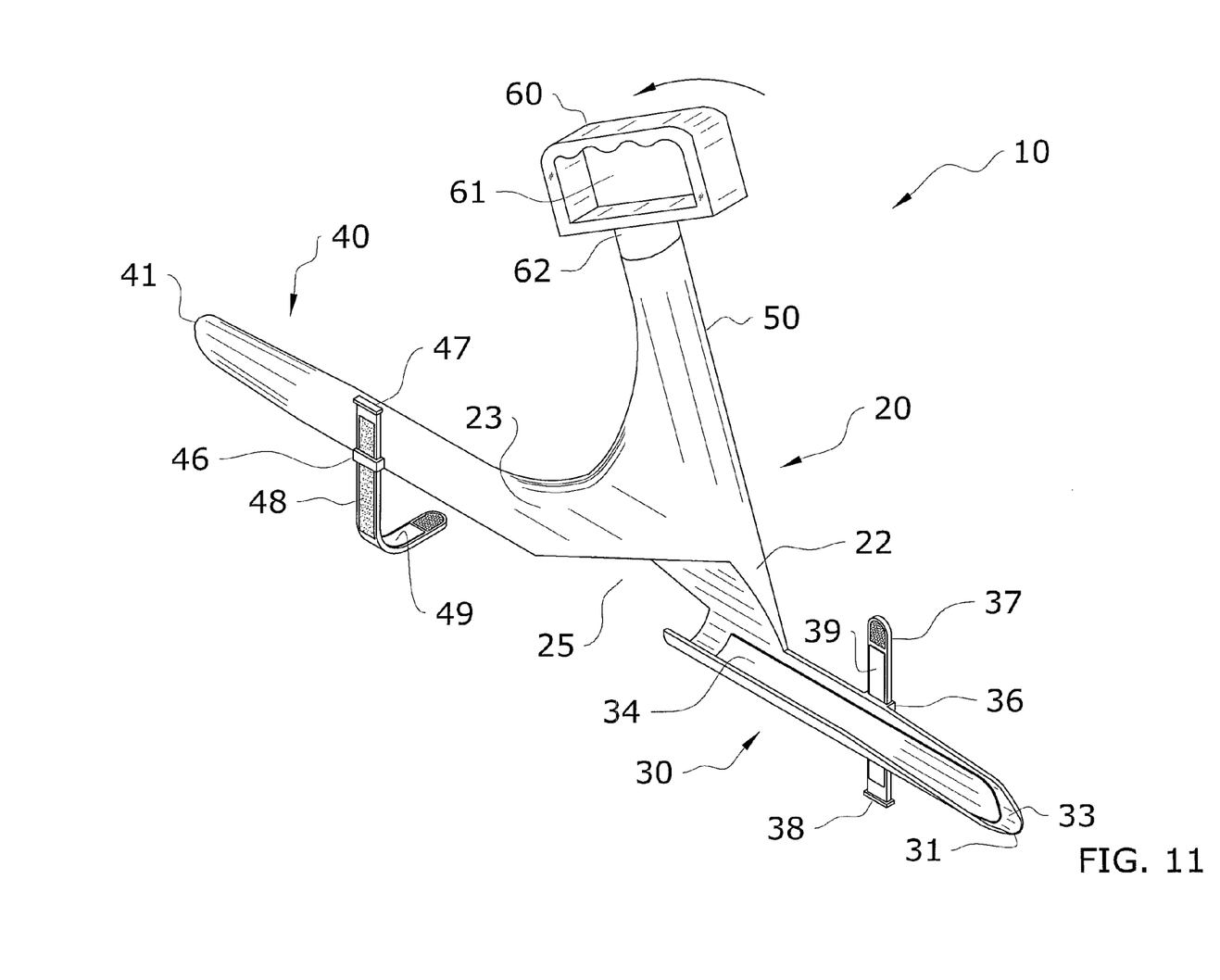
FIG. 11 is an upper perspective view the present invention illustrating a rotating handle.
Figure 12:
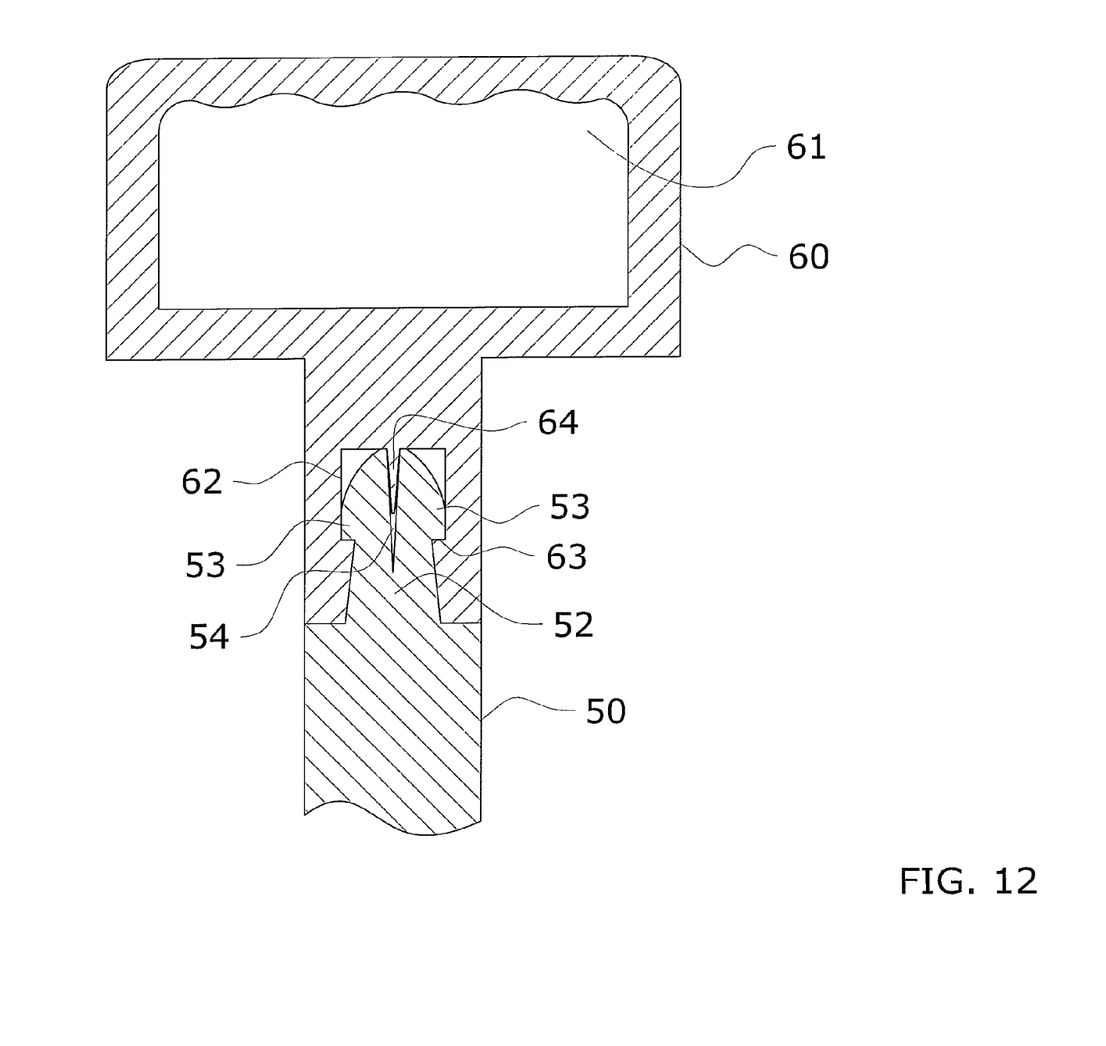
FIG. 12 is a sectional view of the present invention illustrating the rotational connection of the auxiliary handle and shaft.
Figure 13:
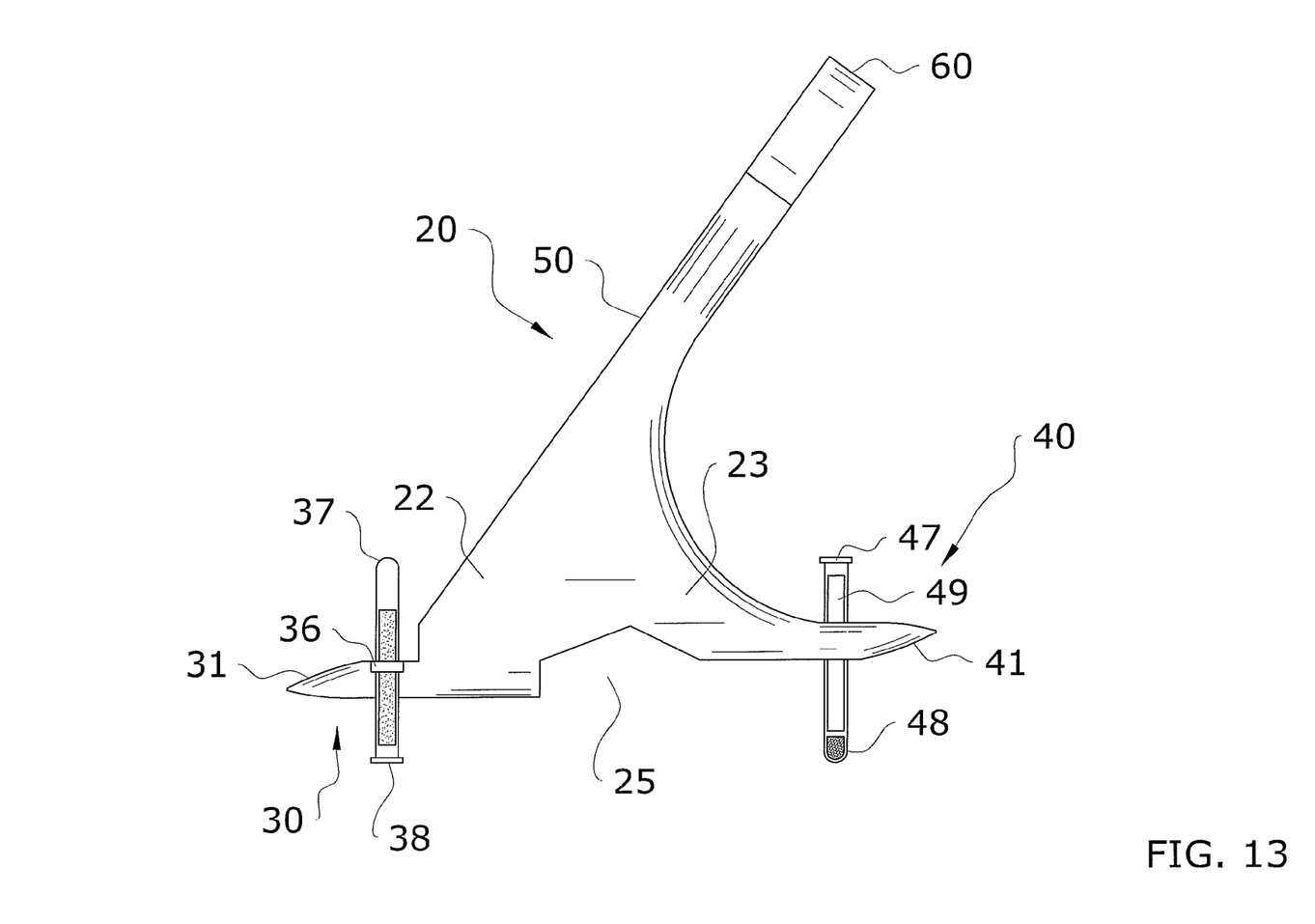
FIG. 13 is a side view of an alternate embodiment of the present invention illustrating the channel members shortened in length thus decreasing amount of material needed and cost.

In use, the midway point along the length of the shaft 13 of the tool 12 is first positioned within the opening so that the shaft 13 intersects the longitudinal length of the mounting structure 20 as illustrated in FIG. 3. The shaft 13 is then pivoted so that the shaft 13 is collectively received within both the first channel 33 of the first channel member 30 and the second channel 43 of the second channel member 40 as illustrated in FIG. 4.

The mounting structure 20 may then be slid along the length of the shaft 13 until a proper longitudinal positioning is achieved. The fastening members 37, 47 are then looped around the respective portions of the shaft 13 and affixed tightly so that the grip material 39, 49 of the fastening members 37, 47 and the grip material 34, 44 of the channels members 30, 40 both tightly engage the shaft 13 and thus frictionally prevent the shaft 13 from sliding or moving with respect to the mounting structure 20.

Attaching the mounting structure 20 to the shaft 13 of the desired tool 12 will effectively lock and grasp the auxiliary handle 60 to the shaft 13. This is done by the combined weight of implement 14 and forward end of shaft 13 pulling down on the first channel member 30 which in turn pushes up on the second channel member 40. The added force of pulling the opposing end of the shaft 12 (as the implement 14) toward the auxiliary handle 60 increases channel members 30, 40 grip and friction. The more pull on opposing end of the shaft 12 (or handle of the shaft) towards the auxiliary handle 60 and/or load on implement 14 the stronger the grip and hold of the channel members 30, 40.

The use of fastening members 37, 48 is not necessary for holding the auxiliary handle 60 to the shaft 13 while in use or forces are present. The mounting structure 20 will effectively lock/grasp the shaft 13 without fastening members 37, 48 and/or grip material 39, 49 with forces present. Fastening members 37, 48 may be used for holding the auxiliary handle 60 to the mounting structure 20 between uses and applied forces. The upright orientation of the auxiliary handle 60 may also assist in picking up the tool 12 off of the ground and/or leaning the tool 12 and auxiliary handle 60 against an object between uses.

When the present invention is attached to the shaft 13 of the tool 12, the tool 12 may be use by grasping the auxiliary handle 60 with one hand and the end of the shaft 13 (opposite the implement 14) with the other hand and controlling the tool 12 in a normal manner. The vertical extension of the auxiliary shaft 50 away from the shaft 13 of the tool 12 allows the user to control the tool 12 without requiring the user to bend over substantially.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An auxiliary handle attachment for a tool, comprising:
a mounting structure having a first channel member and a second channel member;
wherein said first channel member is longitudinally spaced apart from said second channel member;
wherein said first channel member has a first closed side and a first open side opposite said first closed side;
wherein said first closed side and said first open side define a first channel extending therethrough;
wherein said second channel member has a second closed side and a second open side opposite said second closed side;
wherein said second closed side and said second open side define a second channel extending therethrough;
wherein said first open side longitudinally aligns with said second closed side and wherein said first closed side longitudinally aligns with said second open side;
wherein said first channel aligns with said second channel to collectively receive an elongated shaft of a tool from said first open side and said second open side; and
an auxiliary shaft angularly extending from said mounting structure.

2. The auxiliary handle attachment of claim 1, wherein said first channel member and said second channel member each have a V-shaped cross-section.

3. The auxiliary handle attachment of claim 1, wherein said first channel member has a first tapered distal end opposite said second channel member and wherein said second channel member has a second tapered distal end opposite said first channel member.

4. The auxiliary handle attachment of claim 1, wherein said first channel member has a first grip material along an interior of said first closed side and wherein said second channel member has a second grip material along an interior of said second closed side.

5. The auxiliary handle attachment of claim 1, including a first fastening member to laterally extend around said first open side of said first channel member and a second fastening member to laterally extend around said second open side of said second channel member.

6. The auxiliary handle attachment of claim 5, wherein said first fastening member includes a first grip material thereon and wherein said second fastening member includes a second grip material thereon.

7. The auxiliary handle attachment of claim 1, wherein said mounting structure includes an open portion longitudinally separating said first channel member from said second channel member.

8. The auxiliary handle attachment of claim 1, including an auxiliary handle extending from said shaft.

9. The auxiliary handle attachment of claim 8, wherein said auxiliary handle is swivelly attached to said auxiliary shaft.

10. An auxiliary handle attachment system, comprising:
a tool having an elongated shaft and an implement, wherein said implement extends from said elongated shaft;
a mounting structure adapted to removably connect to said elongated shaft;
wherein said mounting structure includes a first channel member and a second channel member;
wherein said first channel member has a first channel defined therein and wherein said second channel member has a second channel defined therein;
wherein said first channel aligns with said second channel;
wherein said first channel member defines a lower side of said first channel and wherein said second channel member defines an upper side of said second channel;
wherein said first channel is adapted to receive said elongated shaft of said tool from an upper side of said first channel and engage an underside of said elongated shaft;
wherein said second channel is adapted to receive said elongated shaft of said tool from a lower side of said second channel and engage a top side of said elongated shaft;
an auxiliary shaft extending upwardly from said mounting structure;
wherein said auxiliary shaft angles in a rearward direction relative said implement on a forward end of said elongated shaft; and
an auxiliary handle extending from said shaft.

11. The auxiliary handle attachment of claim 10, wherein said first channel member longitudinally extends in an opposite direction as said second channel member.

12. The auxiliary handle attachment of claim 10, wherein said first channel member comprises an upwardly facing V-shape cross-sectional structure and wherein said second channel member comprises a downwardly facing V-shape cross-sectional structure.

13. The auxiliary handle attachment of claim 10, wherein said first channel member has a first tapered distal end opposite said second channel member and wherein said second channel member has a second tapered distal end opposite said first channel member.

14. The auxiliary handle attachment of claim 10, wherein said first channel member has a first grip material within said first channel and wherein said second channel member has a second grip material within said second channel.

15. The auxiliary handle attachment of claim 10, including a first fastening member to laterally extend around said first channel and said first channel member and a second fastening member to laterally extend around said second channel and said second channel member.

16. The auxiliary handle attachment of claim 15, wherein said first fastening member includes a first grip material thereon and wherein said second fastening member includes a second grip material thereon.

17. The auxiliary handle attachment of claim 10, wherein said mounting structure includes an open portion separating said first channel member from said second channel member.

18. The auxiliary handle attachment of claim 10, wherein said auxiliary handle is swivelly attached to said auxiliary shaft.

19. The auxiliary handle attachment of claim 10, wherein said tool is selected from a group consisting of a rake, a shovel, and a broom.

20. An auxiliary handle attachment system, comprising:
a tool having an elongated shaft and an implement, wherein said implement extends from said elongated shaft;
wherein said tool is selected from a group consisting of a rake, a shovel, and a broom;
a mounting structure adapted to attach to said elongated shaft along a substantially midway point of said elongated shaft;
wherein said mounting structure includes a first channel member and a second channel member;
wherein said mounting structure includes an open portion separating said first channel member from said second channel member;
wherein said first channel member has a first channel defined therein and wherein said second channel member has a second channel defined therein;
wherein said first channel member longitudinally extends in an opposite direction as said second channel member;
wherein said first channel member comprises an upwardly facing V-shape cross-sectional structure and wherein said second channel member comprises a downwardly facing V-shape cross-sectional structure;
wherein said first channel member has a first tapered distal end opposite said second channel member and wherein said second channel member has a second tapered distal end opposite said first channel member;
wherein said first channel member has a first grip material within said first channel and wherein said second channel member has a second grip material within said second channel;
wherein said first channel aligns with said second channel;
wherein said first channel member defines a lower side of said first channel and wherein said second channel member defines an upper side of said second channel;
wherein said first channel is adapted to receive said elongated shaft of said tool from an upper side of said first channel and engage an underside of said elongated shaft;
wherein said second channel is adapted to receive said elongated shaft of said tool from a lower side of said second channel and engage a top side of said elongated shaft;
a first fastening member to laterally extend around said first channel and said first channel member, wherein said first fastening member is comprised of a hook and loop strap;
a second fastening member to laterally extend around said second channel and said second channel member, wherein said second fastening member is comprised of a hook and loop strap;
wherein said first fastening member includes a third grip material thereon and wherein said second fastening member includes a fourth grip material thereon;
an auxiliary shaft extending upwardly from said mounting structure;
wherein said auxiliary shaft angles in a rearward direction relative said implement on a forward end of said elongated shaft; and
an auxiliary handle extending from said shaft.

* * * * *